Jan. 16, 1962 FRANKLIN C. CHIANG 3,017,096

DECODING DEVICE UTILIZING A DELAY LINE

Filed March 18, 1958 6 Sheets-Sheet 1

INVENTOR
FRANKLIN C. CHIANG
BY
ATTORNEY

Jan. 16, 1962 FRANKLIN C. CHIANG 3,017,096

DECODING DEVICE UTILIZING A DELAY LINE

Filed March 18, 1958 6 Sheets-Sheet 2

Jan. 16, 1962 FRANKLIN C. CHIANG 3,017,096

DECODING DEVICE UTILIZING A DELAY LINE

Filed March 18, 1958 6 Sheets-Sheet 3

United States Patent Office 3,017,096
Patented Jan. 16, 1962

3,017,096

DECODING DEVICE UTILIZING A DELAY LINE

Franklin C. Chiang, Palo Alto, Calif., assignor to International Business Machines Corporation, New York, N.Y., a corporation of New York Filed Mar. 18, 1958, Ser. No. 722,249
15 Claims. (Cl. 235—160)

Figure 1A:
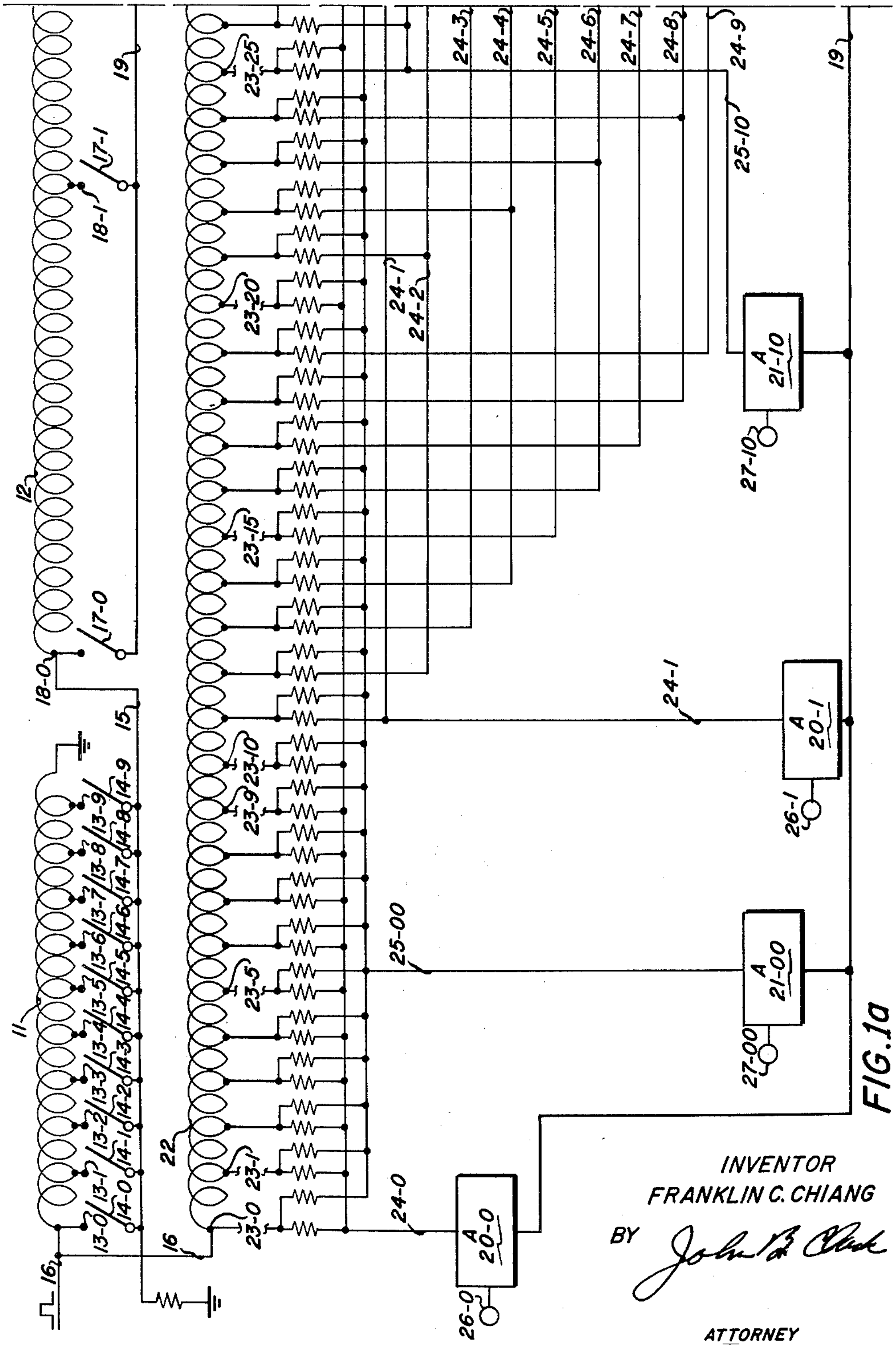
Figure 1B:
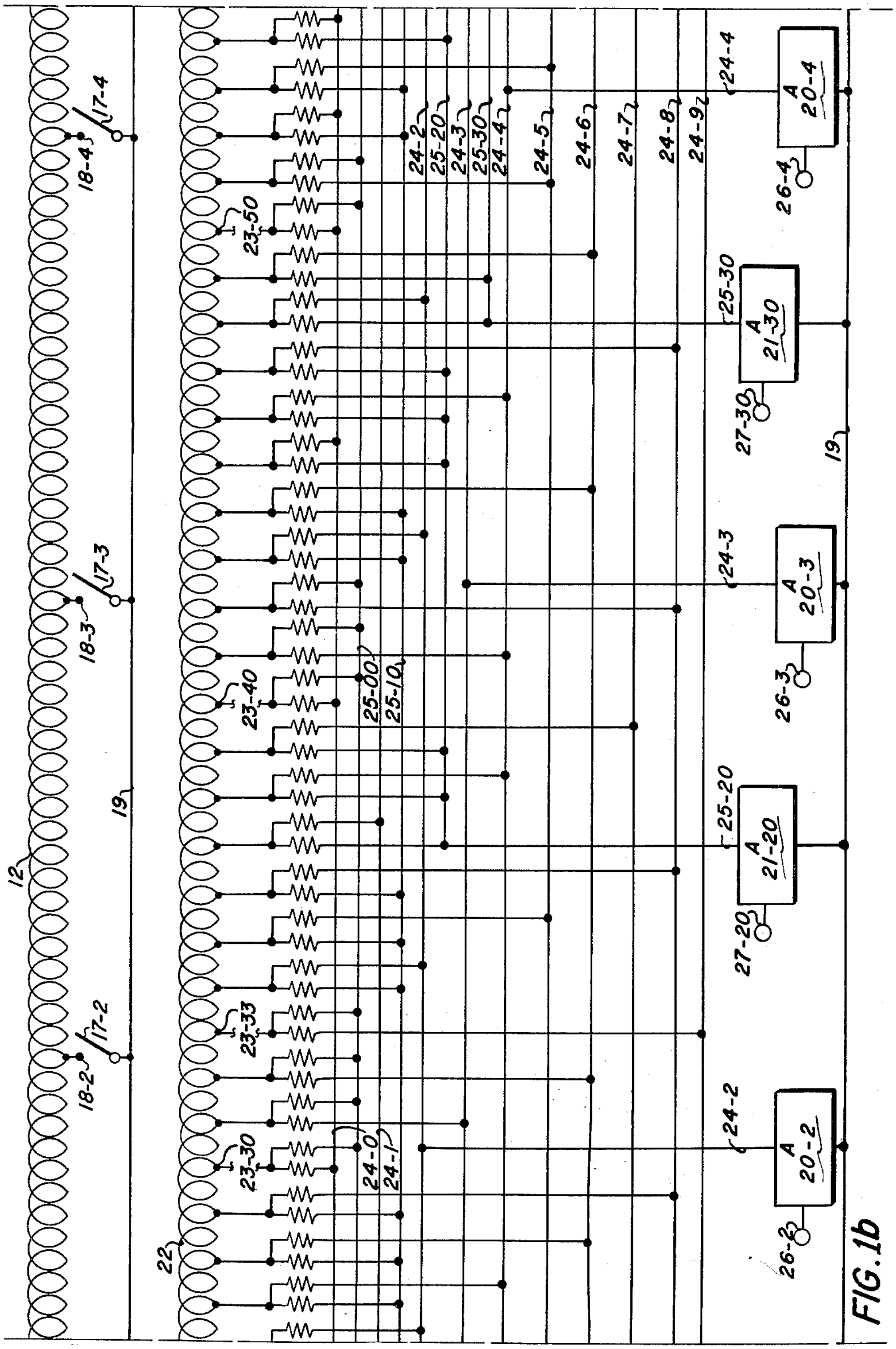
Figure 1C:
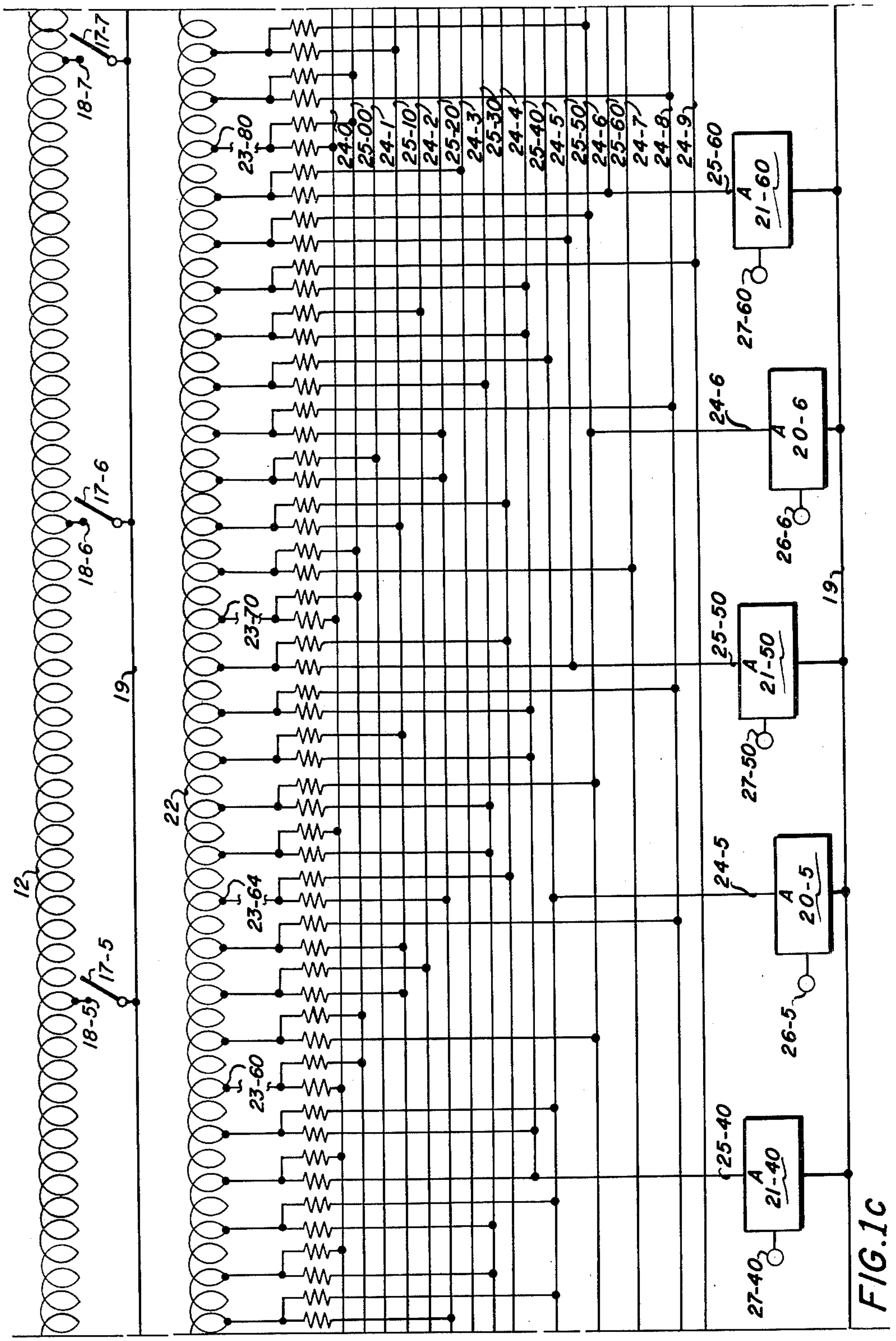

The present invention pertains generally to decoding devices and relates more particularly to such devices adapted to perform multiplication operations.

Multiplication in digital computers is sometimes achieved by the use of matrices which simulate the multiplication table. In such devices a two-coordinate matrix controlled according to a multiplier and a multiplicand is utilized to switch signals to appropriate circuits according to the corresponding product. Each digit of the multiplier may be compared successively with the various digits of the multiplicand for developing a sequence of partial products according to the multiplication table, which partial products are then accumulated to determine the products of the multiplier and multiplicand.

An object of the present invention is to provide a new and improved decoding matrix.

Another object is to provide a new decoding matrix adapted to operate in accordance with the multiplication table.

Still another object is to provide a novel circuit for developing the partial product of two digits.

According to the invention two delay lines are provided for representing two digits to be multiplied, the length of these lines being determined according to the numerical value of the digits involved. The total length of the two lines is then determined for identifying the product. In the disclosed embodiment adapted for multiplication of decimal digits, each delay line is provided with ten taps representative of the ten decimal digits 0 through 9. The total delay afforded by a first of the two lines is less than or equal to the delay provided between adjacent taps of the second line. A signal is entered into the first delay line and is taken therefrom for entry into the second delay line after a delay corresponding to one digit. Additionally, this signal is taken from the second line after a further delay corresponding to the second digit. Thus, the delay afforded by the two lines is distinctive and is determined by the particular numerical values of the multiplier and multiplicand. Means are provided for identifying the resulting delay to determine thereby the corresponding partial product.

Another object is to provide a two-coordinate decoding matrix operable in response to the sum of delays representative of the two coordinates.

Still another object is to provide a device for determining a product according to the sum of time intervals which are representative of a multiplier and a multiplicand.

A further object is to provide a device for delaying a signal according to a multiplier and a multiplicand and for determining this delay to identify the product.

Other objects of the invention will be pointed out in the following description and claims and illustrated in the accompanying drawings, which disclose, by way of example, the principle of the invention and the best mode which has been contemplated of applying that principle.

In the drawings:

FIGS. 1*a* through 1*d* comprise a schematic diagram of the simplified form of the disclosed embodiment of the invention.

Figure 2A:
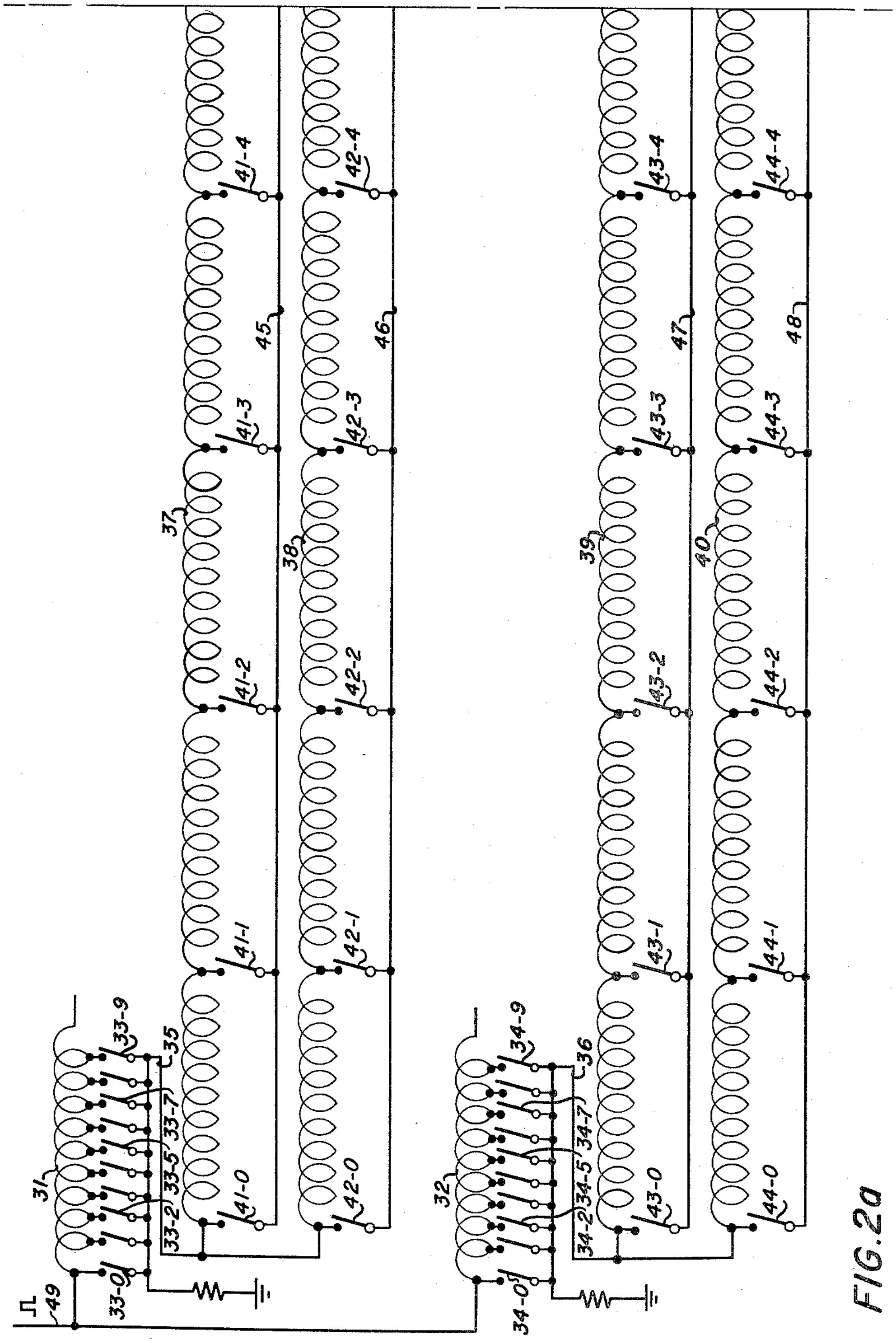
Figure 2B:
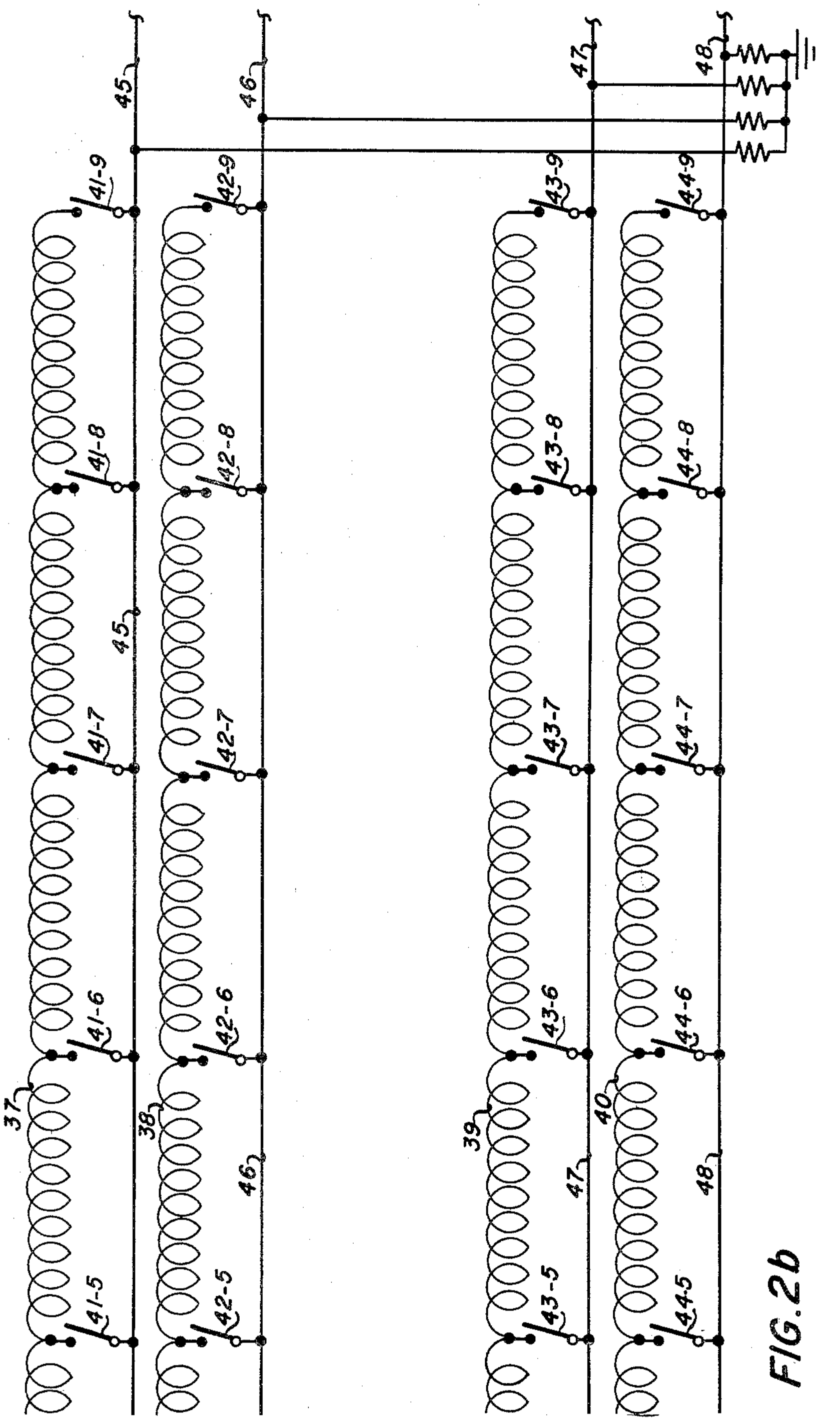

FIGS. 2*a* and 2*b* disclose a circuit arranged to provide the partial products resulting from the multiplication of two 2-order digits.

Figure 3:
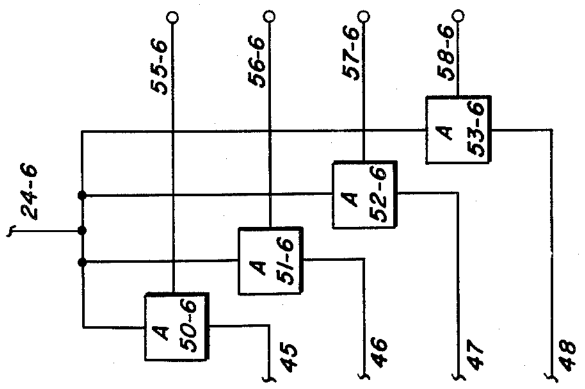
Figure 1D:
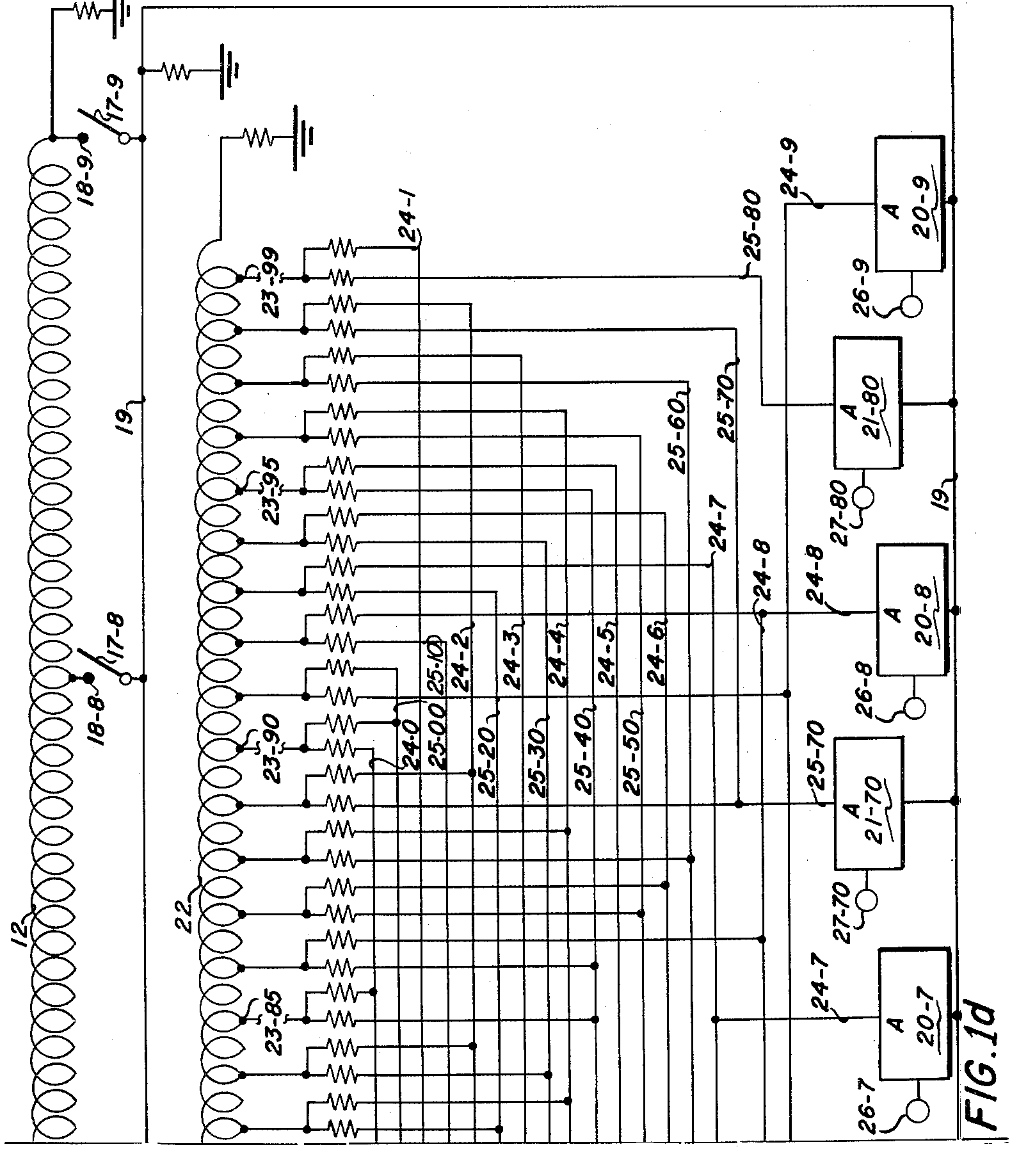

FIG. 3 is a schematic diagram of one of the several gating circuits utilized in connection with the circuitry shown in FIG. 2.

Referring now to the drawing, the disclosed embodiment comprises two delay lines 11 and 12 (FIG. 1), the effective electrical lengths of which are determined by the multiplier digit and the multiplicand digit, respectively. The multiplier line 11 is provided with ten taps 13 therealong, these taps being identified by the reference numerals 13–0 through 13–9, and a plurality of corresponding switches 14–0 through 14–9 are arranged for connecting selected taps 13 to a conductor 15 according to the value of the multiplier digit.

Although not essential to the invention, as will become clear, the taps 13 are equally spaced at intervals arranged to provide a convenient unit of delay between adjacent taps. Thus, if a signal is entered on a conductor 16 connected to the input of the line 11, this signal passes through a portion of the line 11 determined by the multiplier digit and appears on the conductor 15 after a corresponding number of delay units. For example, if the multiplier digit were 7, the switch 14–7 would be operated and a signal entered on the conductor 16 would appear on the conductor 15 after having been delayed by seven units of delay.

It should be noted at this time that, to simplify an understanding of the invention, the switches 14, as well as switches 17 associated with the multiplicand delay line 12, are shown as manually operated switches since the particular switching technique utilized forms no part of the invention. Suitable electronic switching for specific applications will be readily apparent to those skilled in the art, and for this reason the scope of the invention should not be limited to the disclosed switching method.

The conductor 15 connects to the input of the multiplicand delay line 12, which line is also provided with ten equally spaced taps 18–0 through 18–9. The switches 17–0 through 17–9 connect between the corresponding taps 18 and a conductor 19 and are operated to connect a selected tap 18 to the conductor 19 according to the multiplicand digit. The taps 18 in the disclosed embodiment are so spaced as to provide ten units of delay between adjacent taps, altthough it will be understood that it is only necessary that the delay between adjacent taps in the line 12 be equal to or greater than the delay provided between the tap 13–0 and the tap 13–9 of the delay line 11. The conductor 19 connects to one input of each of a plurality of AND gates 20–0 through 20–9 as well as to one input of each of a plurality of AND gates 21–00 through 21–80. Thus, a signal applied to the input conductor 16 is applied to the various gates 20 and 21 after a period of time corresponding to the sum of delays representative of the multiplier and multiplicand digits.

In addition to connecting to the input of the delay line 11, the conductor 16 connects to the input of a master delay line 22 which is utilized to interpret the delay afforded signals entered on the conductor 19. The line 22 is provided with 100 taps 23–0 through 23–99 spaced according to the spacing of the taps on the lines 11 and 12. In the present embodiment, therefore, the taps 23 are spaced to provide one unit of delay between adjacent taps or 99 units of delay between the first tap and the last tap.

Each of the taps 23 of the delay line 22 connects through suitable isolating resistors to one or more of several conductors 24–0 through 24–9 and 25–00 through 25–80, which conductors form the second input to the corresponding AND gates 20–0 through 20–9 and 21–00 through 21–80, respectively. Thus, for example, a signal entered on the conductor 16 will connect from the tap 23–33 and through the conductors 24–9 and 25–00 to the AND gates 20–9 and 21–00, respectively, after a period of time equal to 33 units of delay. Similarly, this signal will connect from the tap 23–64 and through the conductors 24–4 and 25–20 to the AND gates 20–4 and 21–20, respectively, after 64 units of delay, etc.

A coincidence of signals on the inputs to one of the several AND gates 20 or 21 causes a signal to appear on the output thereof for entry onto the corresponding one of several conductors 26–0 through 26–9 or 27–00 through 27–80 and, as will become clear, signals appearing on these lines indicate the product of the digits entered into the switches 14 and 17. Assuming that only one switch 14 and one switch 17 are operated at a time, it will be noted that the delay afforded a signal entered onto the conductor 16 and taken from the conductor 19 is distinctive for each possible combination of operation of the switches. It is this knowledge that permits interpretation of the delay for determining the product.

An analysis of the various delay intervals representative of the possible products indicates that a delay of less than ten units is possible only when the multiplicand is equal to 0. Thus, when the signal taken from the delay line 12 has been delayed by less than ten units, it is desired to indicate that the product is equal to 0. For this reason, the taps 23–0 through 23–9 of the delay line 22 connect to the AND gates 20–0 and 21–00. The signal taken from the delay line 12 connects to all of the AND gates 20 and 21. However, there is a coincidence in only one gate of each of the groups 20 and 21 depending upon the sum of the delays provided by the lines 11 and 12. If, for example, the multiplier is equal to 7 and the multiplicand is equal to 0, a signal on the conductor 19 appears at a time when the signal taken from the tap 23–7 connects through conductors 24–0 and 25–00 to AND gates 20–0 and 21–00, respectively, for entering a signal on conductors 26–0 and 27–00, respectively, to indicate a product equal to 0.

The delay afforded other signals taken from the delay line 12 is determined in a similar manner according to the time intervals at which the signals are taken from the various taps 23 of the delay line 22. As another example to provide further clarification of the operation of the invention, assume that a multiplier equal to 7 is entered in the switches 14 by operating switch 14–7 and that a multiplicand equal to 8 is entered into switches 17 by operating the switch 17–8. A signal applied to the conductor 16 appears on the conductor 19 after a delay of 87 units at which time this signal also appears on the conductors 24–6 and 25–50 connected to the AND gates 20–6 and 21–50. Thus, in this example the product 56 is indicated by the signals appearing on conductors 26–6 and 27–50 connected to the outputs of the above mentioned AND gates. It will now be understood that the product of any two digits is determined according to the sum of the delay intervals representative of the multiplier and the multiplicand, the sum being interpreted according to the master delay line 22.

The simple matrix described above may be extended to provide for the simultaneous identification of a number of partial products. Referring to FIGS. 2*a* and 2*b*, structure providing for the multiplication of two 2-digit numbers is disclosed. This circuit is arranged to provide partial products resulting from the multiplication of AB×CD. The various partial products to be obtained are BD, BC, AD and AC, the product being determined by the summation of these. Two multiplier delay lines 31 and 32, each of which may be identical to the delay line 11 (FIG. 1), are shown, these lines being provided with switches 33 and 34 (FIG. 2), respectively, for connecting the various taps thereof to conductors 35 and 36, respectively.

Since it is necessary to multiply each multiplicand digit by each multiplier digit, two multiplicand delay lines 37, 38 and 39, 40 are connected to the conductors 35 and 36, respectively. The lines 37, 38, 39 and 40 may be identical to the line 12 (FIG. 1) and are provided with switches 41, 42, 43 and 44, respectively (FIG. 2), for connecting the corresponding taps thereof to conductors 45, 46, 47 and 48, respectively. The multiplier B is entered into switches 33, the multiplier A being entered into switches 34. Similarly, the multiplicand D is entered into the switches 41 as well as into the switches 43, the multiplicand C being entered in the switches 42 and 44. In this way a signal applied to a conductor 49 connected to the input of each of the delay lines 31 and 32 appears on the output conductors 45, 46, 47 and 48 after delay intervals corresponding to the various partial products BD, BC, AD and AC, respectively.

The values of the partial products represented by the signals entered onto the output conductors 45, 46, 47 and 48 are determined according to a master delay line (not shown) such as the delay line 22 shown in FIG. 1. However, in this instance each of the various AND gates 20 and 21 associated with the delay line 22 is replaced by a group of four AND gates 50, 51, 52 and 53 in the manner shown in FIG. 3. Each of the conductors 45, 46, 47 and 48 connects to one input of the corresponding gates 50, 51, 52 and 53, respectively, of each of the 19 groups thereof, the various conductors corresponding to the conductors 24 and 25 (FIG. 1) being connected to the second input of each of the four AND gates 50, 51, 52 and 53 (FIG. 3) associated therewith. In FIG. 3 the conductor 24–6 is shown as connected to the second input of each of the AND gates 50–6, 51–6, 52–6 and 53–6.

Signals indicative of the partial products appear on the corresponding output conductors 55 through 58 connected to the output taps of the AND gates 50 through 53, respectively. Thus, for example, if the partial product BD contains a 6 in the units order thereof, a signal appears on the output conductor 55–6. In summation, signals appear on the conductors 45 through 48 after delays corresponding to the partial products BD, BC, AD and AC, respectively, these partial products being determined in the AND gates 50 through 53, respectively, for entering signals representative of these partial products on certain of the conductors 55 through 58 for defining these partial products. The resultant product may then be determined by summation of the various partial products, taking into consideration decimal point locations. This structure is not disclosed since it forms no portion of the invention, the present invention being directed solely to circuits for obtaining the partial products. Several methods for accumulating the partial products developed according to the invention will be readily apparent to those skilled in the art.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination, a first delay means settable for delaying signals a period of time corresponding to a first coordinate, a second delay means settable for further delaying said signals an additional period of time corresponding to a second coordinate, a plurality of output circuits each of which corresponds to predetermined combinations of said first and second coordinates, and means responsive to the total delay of said signals by said first and second delay means for entering said signals into those of said output circuits corresponding to said first and second coordinates.

2. In combination, a first delay means for delaying signals a period of time corresponding to a first coordinate, a second delay means for further delaying said signals an additional period of time corresponding to a second coordinate, a plurality of output circuits each of which corresponds to predetermined combinations of said first and second coordinates, a gating circuit associated with each output circuit, means for selectively conditioning said gating circuits at predetermined times, and means for connecting signals delayed by said first and second delay means to said gating circuits for entry into those of said output circuits corresponding to said first and second coordinates.

3. In combination, a first delay means settable for delaying signals a period of time corresponding to a first coordinate, a second delay means settable for further delaying said signals an additional period of time corresponding to a second coordinate, a plurality of output circuits each of which corresponds to predetermined combinations of said first and second coordinates, a gating circuit associated with each output circuit, a third delay means arranged in parallel with said first and second delay means for generating signals for conditioning said gating circuits at predetermined times, means for selectively connecting said conditioning signals to said gating circuits according to said predetermined combinations, and means for connecting signals delayed by said first and second delay means to said gating circuits for entry into those of said output circuits corresponding to said first and second coordinates.

4. In combination, a first delay means settable for delaying signals a period of time corresponding to a first coordinate, a second delay means settable for further delaying said signals an additional period of time corresponding to a second coordinate, a plurality of output circuits each of which corresponds to predetermined combinations of said first and second coordinates, a third delay means arranged in parallel with said first and second delay means for generating signals at predetermined times, and means responsive to a coincidence of signals from said second and third delay means for entering a signal into those of said output circuits corresponding to said first and second coordinates.

5. A decoding matrix for entering signals on selected output lines according to two coordinates comprising a first delay device for delaying a signal a period of time corresponding to a first coordinate, a second delay device for further delaying said signal an additional period of time corresponding to a second coordinate, a plurality of coincidence circuits, means for conditioning said circuits selectively at predetermined times determined according to the possible delays afforded signals delayed by said first and second delay devices, and means for connecting signals taken from said second delay device to said coincidence circuits for entry onto output lines corresponding to coincidence circuits conditioned at that time, whereby signals are entered onto output lines according to said two coordinates.

6. A circuit for performing multiplication comprising means for delaying a signal according to a multiplier digit, means for further delaying said signal according to a multiplicand digit, and means responsive to the total delay of said signal for indicating the product of said digits.

7. A multiplication circuit comprising a first delay means settable according to a multiplier, a second delay means settable according to a multiplicand, means for adding the delays afforded by said first and second delay means, and means responsive to the result of said addition for determining the product of said multiplier and said multiplicand.

8. A multiplication device comprising a first delay means for delaying signals entered therein according to a first digit, a second delay means for further delaying signals taken from said first delay means according to a second digit, means for entering a signal in said first delay means for passage through said first and second delay means, means responsive to said entered signal for initiating master signals at predetermined time intervals, and means responsive to the occurrence of a master signal when the signal entered in said first delay means is taken from said second delay means for generating a product signal indicative of the product of said first and second digits.

9. A multiplying device comprising a first delay line having a plurality of taps, said first delay line having an input circuit, a second delay line having a plurality of taps, said second delay line having an input circuit, means for connecting a selected tap of said first delay line to the input circuit of said second delay line according to a first number, means for connecting a selected tap of said second delay line to an output circuit according to a second number, the delay provided between adjacent taps of one of said delay lines being greater than the delay provided between said adjacent taps of the other said delay line such that the total delay afforded by both of said delay lines is distinctive for each possible combination of selected taps, and means for determining the total delay afforded by said first and second delay lines, whereby the product of said first and second numbers is identified according to the total delay afforded by said first and second delay lines.

10. A multiplying device comprising a first delay device having an input and an output, the delay afforded by said device being settable in predetermined increments according to the numerical value of a first digit, a second delay device having an input and an output, the delay afforded by said second device being settable in predetermined increments according to the numerical value of a second digit, the input to said second device being connected to the output of said first device, a matrix of coincidence circuits, each of said circuits including a first input, a second input and an output, one input of each of said circuits being connected to the output of said second delay device, a decoding device having an input and an output, means for connecting an input signal to the inputs of said first delay device and said decoding device, said decoding device being responsive to said input signal for sequentially developing decoding signals at predetermined time intervals, and means for connecting selected decoding signals to the second inputs of corresponding coincidence circuits, said coincidence circuits being arranged to generate output signals in the outputs thereof in response to a coincidence of signals on the inputs thereto, whereby the product of said first and second digits is determined according to said output signals.

11. In combination, a first delay line having an input and an output, said first delay line being provided with a plurality of taps therealong spaced to provide a single unit of delay between adjacent taps, means for connecting a selected tap of said first delay line to said output thereof, a second delay line having an input and an output, the input to said second delay line being connected to the output of said first delay line, said second delay line being provided with a plurality of taps therealong spaced to provide a multiplicity of delay units between adjacent taps, means for connecting a selected tap of said second delay line to said output thereof, a third delay line having a plurality of taps therealong spaced to provide a single unit of delay between adjacent taps, said third delay line having an input connected to the input of said first delay line, means for connecting a signal to the inputs of said first and third delay lines, a plurality of coincidence circuits each of which is connected to the output of said second delay line, and means connecting the taps of said third delay line to selected of said coincidence circuits, whereby a coincidence of signals occurs in said coincidence circuits according to the selection of connected taps of said first and second delay lines.

12. In combination, a first delay means settable for delaying signals a period of time corresponding to a first coordinate, a second delay means settable for further delaying said signals an additional period of time corresponding to a second coordinate, a plurality of output circuits each of which corresponds to predetermined combinations of said first and second coordinates, and means responsive to the total delay of said signals by said first and second delay means for entering said signals into one of said output circuits corresponding to a function of said first and second coordinates.

13. In combination, a first delay means for delaying signals a period of time corresponding to a first coordinate, a second delay means for further delaying said signals an additional period of time corresponding to a second coordinate, a plurality of output circuits each of which corresponds to predetermined combinations of said first and second coordinates, a gating circuit associated with each output circuit, means for selectively conditioning said gating circuits at predetermined times, and means for connecting signals delayed by said first and second delay means to said gating circuits for entry into one of said output circuits corresponding to a function of said first and second coordinates.

14. In combination, a first delay means settable for delaying signals a period of time corresponding to a first coordinate, a second delay means settable for further delaying said signals an additional period of time corresponding to a second coordinate, a plurality of output circuits each of which corresponds to predetermined combinations of said first and second coordinates, a gating circuit associated with each output circuit, a third delay means arranged in parallel with said first and second delay means for generating signals for conditioning said gating circuits at predetermined times, means for selectively connecting said conditioning signals to said gating circuits according to said predetermined combinations, and means for connecting signals delayed by said first and second delay means to said gating circuits for entry into one of said output circuits corresponding to a function of said first and second coordinates.

15. In combination, a first delay means settable for delaying signals a period of time corresponding to a first coordinate, a second delay means settable for further delaying said signals an additional period of time corresponding to a second coordinate, a plurality of output circuits each of which corresponds to predetermined combinations of said first and second coordinates, a third delay means arranged in parallel with said first and second delay means for generating signals at predetermined times, and means responsive to a coincidence of signals from said second and third delay means for entering a signal into one of said output circuits corresponding to a function of said first and secnd coordinates.

References Cited in the file of this patent

UNITED STATES PATENTS

| | | |
|---|---|---|
| 2,403,561 | Smith | July 9, 1946 |
| 2,465,355 | Cook | Mar. 29, 1949 |
| 2,525,893 | Gloess | Oct. 17, 1950 |
| 2,536,032 | Clark | Jan. 2, 1951 |
| 2,635,229 | Gloess et al. | Apr. 14, 1953 |
| 2,686,632 | Wilkinson | Aug. 17, 1954 |
| 2,729,811 | Gloess | Jan. 3, 1956 |
| 2,758,787 | Felker | Aug. 14, 1956 |
| 2,822,131 | Aigrain | Feb. 4, 1958 |
| 2,844,308 | Dussine | July 22, 1958 |